US010146473B2

(12) United States Patent
Decker et al.

(10) Patent No.: US 10,146,473 B2
(45) Date of Patent: Dec. 4, 2018

(54) SYSTEMS AND METHODS OF SUBJECT STATE CHANGE NOTIFICATION

(71) Applicant: GE Aviation Systems LLC, Grand Rapids, MI (US)

(72) Inventors: Christian Reynolds Decker, Ada, MI (US); Troy Stephen Brown, Kalamazoo, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 69 days.

(21) Appl. No.: 15/150,777

(22) Filed: May 10, 2016

(65) Prior Publication Data
US 2017/0329555 A1 Nov. 16, 2017

(51) Int. Cl.
*G06F 13/00* (2006.01)
*G06F 3/06* (2006.01)
*G06F 9/54* (2006.01)

(52) U.S. Cl.
CPC .......... *G06F 3/0653* (2013.01); *G06F 3/0604* (2013.01); *G06F 3/0656* (2013.01); *G06F 3/0673* (2013.01); *G06F 9/542* (2013.01); *G06F 9/544* (2013.01)

(58) Field of Classification Search
CPC .... G06F 3/0653; G06F 3/0604; G06F 3/0656; G06F 3/0673
See application file for complete search history.

(56) References Cited

U.S. PATENT DOCUMENTS

| 5,179,665 | A | * | 1/1993 | Roslund | G06F 15/167 |
| | | | | | 709/213 |
| 5,991,536 | A | | 11/1999 | Brodsky et al. | |
| 2005/0060721 | A1 | | 3/2005 | Choudhary et al. | |
| 2005/0091219 | A1 | | 4/2005 | Karachale et al. | |
| 2005/0251625 | A1 | * | 11/2005 | Nagae | G06F 11/1471 |
| | | | | | 711/129 |
| 2008/0117462 | A1 | | 5/2008 | Gaebel | |
| 2009/0216782 | A1 | | 8/2009 | Szyperski et al. | |
| 2010/0257201 | A1 | * | 10/2010 | Chen | H04L 67/322 |
| | | | | | 707/770 |
| 2011/0078249 | A1 | * | 3/2011 | Blocksome | G06F 9/544 |
| | | | | | 709/206 |

(Continued)

OTHER PUBLICATIONS

Office Action issued in connection with corresponding CA Application No. 2965283 dated Mar. 15, 2018.

(Continued)

*Primary Examiner* — Charles Rones
*Assistant Examiner* — Han Doan
(74) *Attorney, Agent, or Firm* — GE Aviation Systems LLC; William Andes

(57) ABSTRACT

Systems and methods for notifying one or more observers of one or more state changes are provided. For instance, at least one subject can be configured to write data to a buffer in a shared memory space. One or more observers can have an associated notification group that includes one or more buffer identifiers corresponding to a buffer in the shared memory space. A scheduler can be configured to detect one or more state changes associated with one or more buffers in the shared memory space and to provide an update notification to at least one observer based at least in part on the one or more detected state changes.

19 Claims, 5 Drawing Sheets

(56) References Cited

U.S. PATENT DOCUMENTS

2013/0262868 A1* 10/2013 Friedman .............. H04L 9/0618
  713/171
2015/0067109 A1*  3/2015 Tang ...................... H04L 67/06
  709/219

OTHER PUBLICATIONS

Extended European Search Report and Opinion issued in connection with corresponding EP Application No. 17169966.3 dated Oct. 9, 2017.

* cited by examiner

SYSTEMS AND METHODS OF SUBJECT STATE CHANGE NOTIFICATION

FIELD OF THE INVENTION

The present subject matter relates generally computing systems, and more particularly to notifying one or more observer objects in a process of a state change associated with a subject object.

BACKGROUND OF THE INVENTION

Observer design patterns can provide a framework for allowing one or more objects to observe a state of one or more additional objects in one or more processes in a computing system. For instance, in typical observer design pattern implementations, an object, called the subject, can maintain a list of dependents, called observers. For instance, an observer can register with a subject when the observer desires to receive notifications associated with one or more state changes of the subject. In this manner, the observer design pattern can provide a loose coupling between a subject and its observers. When a state of the subject changes, the subject can notify each observer registered with the observer of the state change. The notified observers can then perform one or more actions based at least in part on the notification.

In such typical implementations, the subject can suffer a penalty for publishing data. For instance, the subject can use a linked list to associated observers with the subject. The linked list must be traversed by the subject upon a state change of the subject to notify the registered observers of the state change. The processing time to traverse the list can grow as the number of observers registered with the subject increases. In addition, such linked list can provide difficulties in allowing a multi-process implementation wherein observers can be notified about state changes of subjects included in different processes from the observers.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a system for notifying one or more observers of a state change. The system includes at least one subject configured to write data to a buffer in a shared memory space. The system further includes one or more observers having an associated notification group including one or more buffer identifiers. Each buffer identifier corresponds to a buffer in the shared memory space. The system further includes a scheduler configured to detect one or more state changes associated with one or more buffers in the shared memory space, and to provide an update notification to at least one observer based at least in part on the one or more detected state changes.

Another example aspect of the present disclosure is directed to a computer-implemented method of notifying one or more observers of one or more state changes. The method includes receiving, by a scheduler associated with a computing process, a request to register a notification group associated with an observer object. The notification group includes data indicative of one or more subject objects. The method further includes inspecting, by the scheduler, a shared memory space for state changes associated with one or more buffers in the shared memory space. Each buffer corresponds to at least one of the one or more subject objects. The method further includes detecting, by the scheduler, one or more state changes associated with at least one buffer. The method further includes providing, by the scheduler, a notification indicative of at least one detected state change associated with at least one buffer to one or more observer objects.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
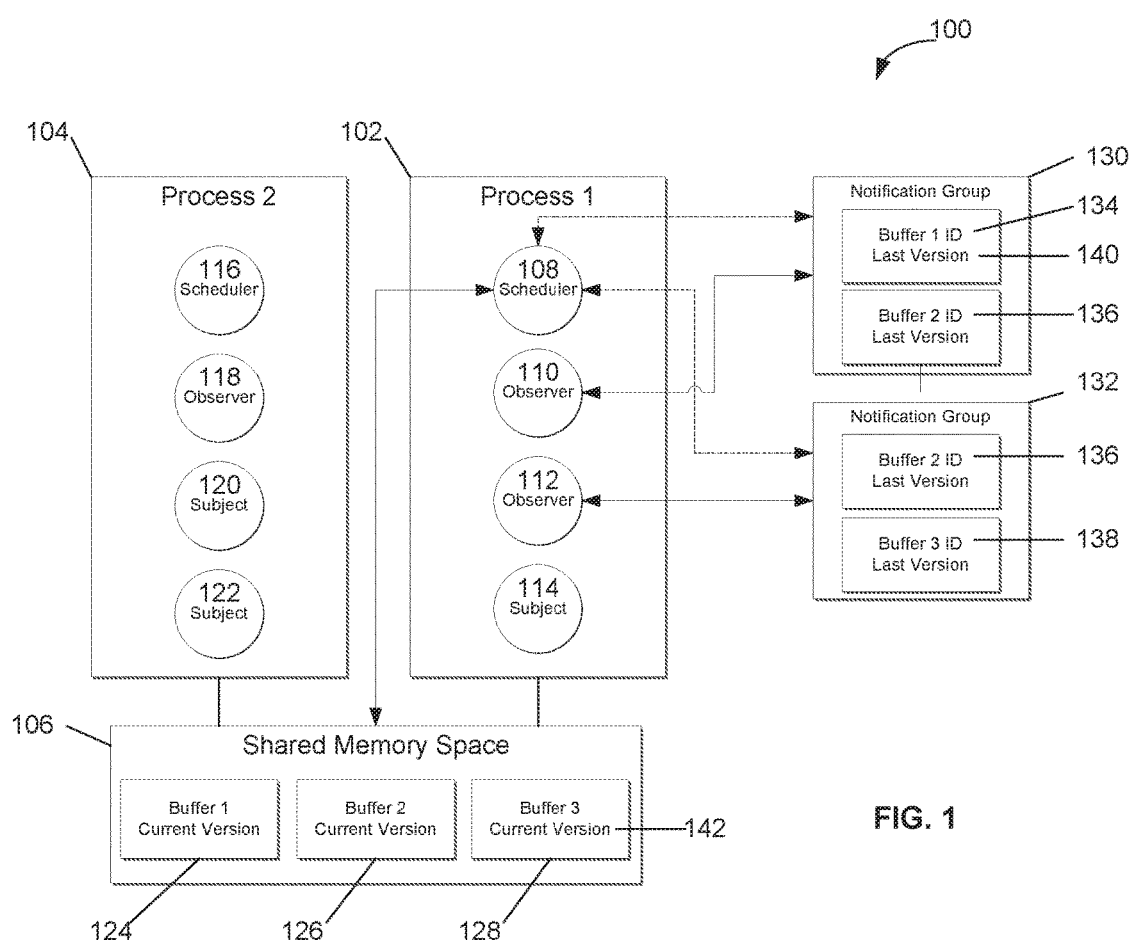
FIG. 1 depicts an example system for notifying one or more observer objects according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to notifying one or more observer objects of a state change associated with a subject object in a computing system. For instance, at least one subject object can be configured to write or publish data to a data buffer in a shared memory space. One or more observer objects can register with a scheduler to observe one or more of the subject objects. The observers can determine a notification group that includes one or more buffer identifiers that respectively point to data buffers in the shared memory space associated with the subjects observed by the observer. The scheduler can be configured to detect a state change associated with the observed data buffers and to provide an update notification to the observers observing the data buffers for which a state change was detected.

More particularly, the computing system can include one or more processes. Each process can include one or more subject objects (e.g. subjects), one or more observer objects (e.g. observers) configured to observe subjects within the computing system, and a scheduler. For instance, an observer object can be any suitable object that observes or desires to observe another object, and a subject object can be any suitable object that is being observed.

As indicated, the subject can be configured to write data to one or more data buffers in a shared memory space. The shared memory space can be a memory space, such as a RAM memory space, accessible to a plurality of processes. Each observer can determine a group of subjects that the observer desires to observe, and can generate a notification group specifying one or more data buffers to which the observed subjects write data. For instance, the notification group can include one or more buffer identifiers, each corresponding to a data buffer in the shared memory space to which an observed subject writes. In some implementations, the buffer identifier can be a buffer handle pointing to the corresponding buffer in the shared memory space. The notification group can further include a buffer version for each specified buffer corresponding to a version of the buffer last known to the observer. For instance, in some implementations, each time a new instance of data is written to a buffer in the shared memory space, a version of the buffer can be incremented in accordance with one or more suitable versioning schemes. In this manner, such last known buffer version can correspond to the most recent version of the buffer in the shared memory space of which the observer is aware.

The observers can register their respective notification groups with a third party, such as a scheduler, and can provide the scheduler with access to the notification group. The scheduler can then monitor the corresponding buffers in the shared memory space to determine a state change of the buffers. For instance, in some implementations, the scheduler can determine a state change relative to an observer by comparing the current version of the buffer as specified in the shared memory space to the last known version of the buffer as specified in a notification group associated with the observer. A match between the current version and the last known version can indicate that the state of the buffer and/or the corresponding subject is the same as the last known version of the buffer by the observer (e.g. no state change). A discrepancy between the current version and the last known version can indicate that the state has changed. For instance, if the current version as specified in the shared memory space has been incremented one or more times relative to the last known version, this can indicate that the new data has been written to the buffer of which the observer is not aware. The scheduler can then notify the observer of the updated buffer. In some implementations, the scheduler can further update the last known version of the buffer in the notification group to match the current version.

According to example aspects of the present disclosure, the scheduler can determine one or more state changes associated with one or more data buffers before notifying the corresponding observers. In particular, the scheduler can be configured to inspect for a state change of multiple data buffers relative to one or more observers before notifying the corresponding observers of the determined state changes. As an example, the scheduler can be configured to inspect for state changes during one or more predetermined update time windows or intervals. During the update windows, the scheduler can iteratively cycle through each notification group registered with the scheduler, inspecting for state changes associated with each buffer identifier in each registered notification group. For instance, during a first update window the scheduler can begin cycling through the registered notification groups. In some implementations, if the scheduler cycles through each registered notification group during the first update window, the scheduler can repeat the cycle from the beginning. At the completion of the first update window, the scheduler can pause the cycle and can cease inspecting for state changes. The scheduler can resume the cycle at the initiation of a second update window. For instance, in some implementations, at the initiation of the second update window, the scheduler can resume inspecting for state changes where the scheduler previously left off. As before, if the scheduler completes the cycle during the second update window, the scheduler can begin the cycle again from the beginning.

In this manner, the scheduler can be configured to periodically inspect for state changes associated with each buffer identifier in each notification group registered with the scheduler. As indicated, when the scheduler determines a state change, the scheduler can notify the appropriate observer(s) of the state change. In some implementations, the scheduler can notify an observer of a state change upon detection of the state change. In some implementations, the scheduler can notify one or more observers of a state change at the completion of one or more cycles. For instance, in some implementations, the scheduler can notify one or more observers upon completion of an update window.

In some implementations, the scheduler can set an update flag of one or more observers to notify. For instance, the flag(s) can be associated with the process that includes the observer for which the notification group was generated. As an example, if the scheduler detects a state change of a first buffer relative to a first observer, the scheduler can set a flag associated with the first observer, and can continue cycling through the registered notification groups. If the scheduler then detects a state change of a second buffer relative to a second observer during the first update window, the scheduler can set a flag associated with the second observer, and can continue cycling through the registered notification groups. At the completion of the first update window, the scheduler can notify the first and second observers of the respective state changes based at least in part on the set flags, and can update the corresponding notification groups to include the current versions of the buffers, as specified in the shared memory space.

As another example, if the scheduler detects a first state change of a buffer relative to an observer during a first update window, the scheduler can set a flag associated with the observer. As indicated, if the scheduler completes the cycle during the first update window, the scheduler may restart the cycle. If, during the repeat of the cycle, the scheduler determines a second state change of the buffer relative to the observer (e.g. if new data was written to the buffer subsequent to the detection of the first state change), the flag can remain set. At the completion of the first update window, the scheduler can notify the observer of the state change, and can update the corresponding notification group to include the current version (corresponding to the second state change) of the buffer as specified in the shared memory space.

The scheduler can be configured to inspect for state changes associated with subjects in one or more processes. For instance, as indicated above, one or more subjects can write data to a shared memory space accessible by a plurality of processes. The schedulers associated with such processes that have access to the shared memory space can be configured to detect state changes of any buffer in the shared memory space. In this manner, an observer can observe a first subject in a first process associated with the computing system, and a second subject in a second process associated with the computing system.

In some implementations, the scheduler may have a maximum limit of notification groups and/or buffer handles that can register with the scheduler. For instance, in such implementations, the scheduler may only be able to accept a number of notification groups and/or buffer handles up to the maximum limit. When the number of registered notification groups and/or buffer handles reaches the maximum limit, the scheduler can refuse registration of an additional notification group.

In some implementations, upon detection of a state change, the scheduler can add one or more observers to notify to an update queue. For instance, the update queue can be used alternatively or additionally to the set flags. The scheduler can provide update notifications to the observers listed in the update queue in accordance with example embodiments of the present disclosure.

Allowing a third party, such as the scheduler, to notify observers of state changes of observed subjects allows the scheduler to detect and notify observers of state changes in an asynchronous manner relative to the actual writing of data to the buffers by the subjects. In this manner, the subject itself is not required to allocate resources to notifying observers of a state change associated with the subject. In addition, imposing a maximum limit and/or update window on the scheduler can allow for a deterministic resource allocation associated with the scheduler (e.g. processing resources and/or memory resources), as the maximum limit and/or update window can provide an indication of the resources required to notify the observers. In particular, the maximum limit and update window can allow for the processing time and memory resources associated with notifying the observers to be statically bound. This can allow for a determination of the worst case processing time and memory usage associated with notifying the observers. Such worst case determination can be advantageous, for instance, in safety-critical, real-time systems wherein resource allocation is important. In addition, because the subjects are configured to write data to the shared memory space, the various observers and/or subjects within the computing system may not be required to be aware of the various other processes within the system.

With reference now to the figures, example aspects of the present disclosure will be discussed in greater detail. For instance, FIG. 1 depicts an example system 100 for notifying one or more observers of state changes according to example embodiments of the present disclosure. System 100 includes processes 102 and 104, and a shared memory space 106. For instance, shared memory space can be a shared RAM space. Process 102 includes a scheduler 108, and one or more objects, such as observers 110 and 112, and a subject 114. Process 104 includes a scheduler 116, and one or more objects, such as an observer 118 and subjects 120 and 122. Shared memory space 106 includes data buffers 124, 126, and 128.

As indicated above, subjects 114, 120, 122 can be configured to write or publish data to shared memory space 106. For instance, subject 114 can be configured to write data to buffer 124, subject 120 can be configured to write data to buffer 126, and subject 122 can be configured to write data to buffer 128. In this manner, shared memory space 106 is accessible to both processes 102 and 104. It will be appreciated that subjects 114, 120, and 122 can be configured to write data to one or more additional buffers in shared memory space 106.

Each observer can be configured to determine a notification group specifying one or more buffers in shared memory space 106 about which the observer wishes to receive notifications. The observer can then register the notification group with a scheduler. For instance, observer 110 can determine notification group 130, and observer 112 can determine notification group 132. It will be appreciated that one or more additional notification groups can be determined by observers 110, 112, and/or 118 without deviating from the scope of the present disclosure. Notification groups 130, 132 can include one or more buffer identifiers respectively corresponding to buffers in shared memory space 106 that the observers desire to observe. For instance, observer 110 desires to observe (e.g. be notified about state changes associated with the subjects) subjects 114 and 120, so observer 110 includes buffer identifier 134 (corresponding to buffer 124) and buffer identifier 136 (corresponding to buffer 126) in notification group 130. As another example, observer 112 desires to observe subjects 120 and 122, so observer 112 includes buffer identifier 136, and buffer identifier 138 (corresponding to buffer 128) in notification group 132. The notification groups 130, 132 can further include an indication of a last observed buffer version 140 associated with the buffer identifiers. For instance, the last buffer version can correspond to the buffer version (in accordance with a suitable versioning scheme) about which the observer was notified.

As indicated above, schedulers 108, and 116 can be configured to periodically inspect shared memory space 106 for state changes associated with subjects 114, 120, 122. For instance, in one example instance, a state change can occur when a subject writes new data to a buffer in shared memory space 106. When new data is written to the buffer, the version of the buffer can be updated in accordance with a selected versioning scheme. For instance, the buffer version can be incremented in accordance with the versioning scheme. In this manner, such state change can be determined based at least in part on a current version indicator 142 of the buffer, as specified in shared memory space 106.

For instance, scheduler 108 can be configured to determine a state change associated with buffer 124 and/or 126 by comparing the last version 140 of buffer identifiers 134, 136, as specified in notification group 130, with the current version 142 of buffers 124, 126, as specified in shared memory space 106. A state change can be detected when last version 140 is different than current version 142.

Scheduler 108 can be configured to detect state changes of each buffer associated with each buffer identifier in each notification group registered with scheduler 108. For instance, when notification group 130 is registered with scheduler 108, scheduler 108 can be configured to periodically inspect buffers 124 and 126 for state changes with respect to observer 110. As another example, when notification groups 130, 132 are registered with scheduler 108, scheduler 108 can be configured to periodically inspect buffers 124, 126, and 128 for state changes with respect to observers 110 and 112.

In some implementations, scheduler 108 can be configured to only inspect for state changes during one or more predetermined update windows. The update windows can be determined in accordance with a resource allocation of system 100. For instance, the update windows can be determined to constrain processor use by scheduler 108 in accordance with the resource allocation. In this manner, scheduler 108 can be configured to inspect shared memory space for state changes of each buffer associated with notification groups 130 and 132 during the one or more update windows, and to cease inspection outside of the update window(s).

Scheduler 108 can be configured to notify observers 110 and 112 of state changes of the buffers associated with notification groups 130 and 132. For instance, subsequent to detecting a state change, scheduler can provide an update notification to observer 108 and/or 110 indicative of the state change. In some implementations, scheduler 108 can further update notification groups 130, 132 such that last version 140 corresponds to current version 142.

As indicated above, in some implementations, scheduler 108 can notify an appropriate observer in response to detecting the state change. For instance, scheduler 108 can notify the observer during the update window in which the state change was detected. In some implementations, upon detection of a state change, scheduler 108 can continue inspecting shared memory space 106 until the completion of the current update window. In such implementations, upon detection of a state change during the update window, scheduler 108 can wait to notify the one or more observers until the current update window is completed. In some implementations, scheduler 108 can notify the one or more observers upon completion of an inspection cycle (e.g. upon inspecting each buffer associated with each registered notification group for a state change).

In some implementations, scheduler 108 can have a maximum limit on the number of buffer identifiers that scheduler 108 can accept. For instance, in some implementations, the maximum limit on buffer identifiers can impose a limit on a number of update notifications that scheduler 108 is configured to provide. The maximum limit can be determined based at least in part on a resource allocation associated with system 100. For instance, the maximum limit can be determined to constrain an amount of resources used by scheduler 108 in inspecting for state changes.

Figure 2:
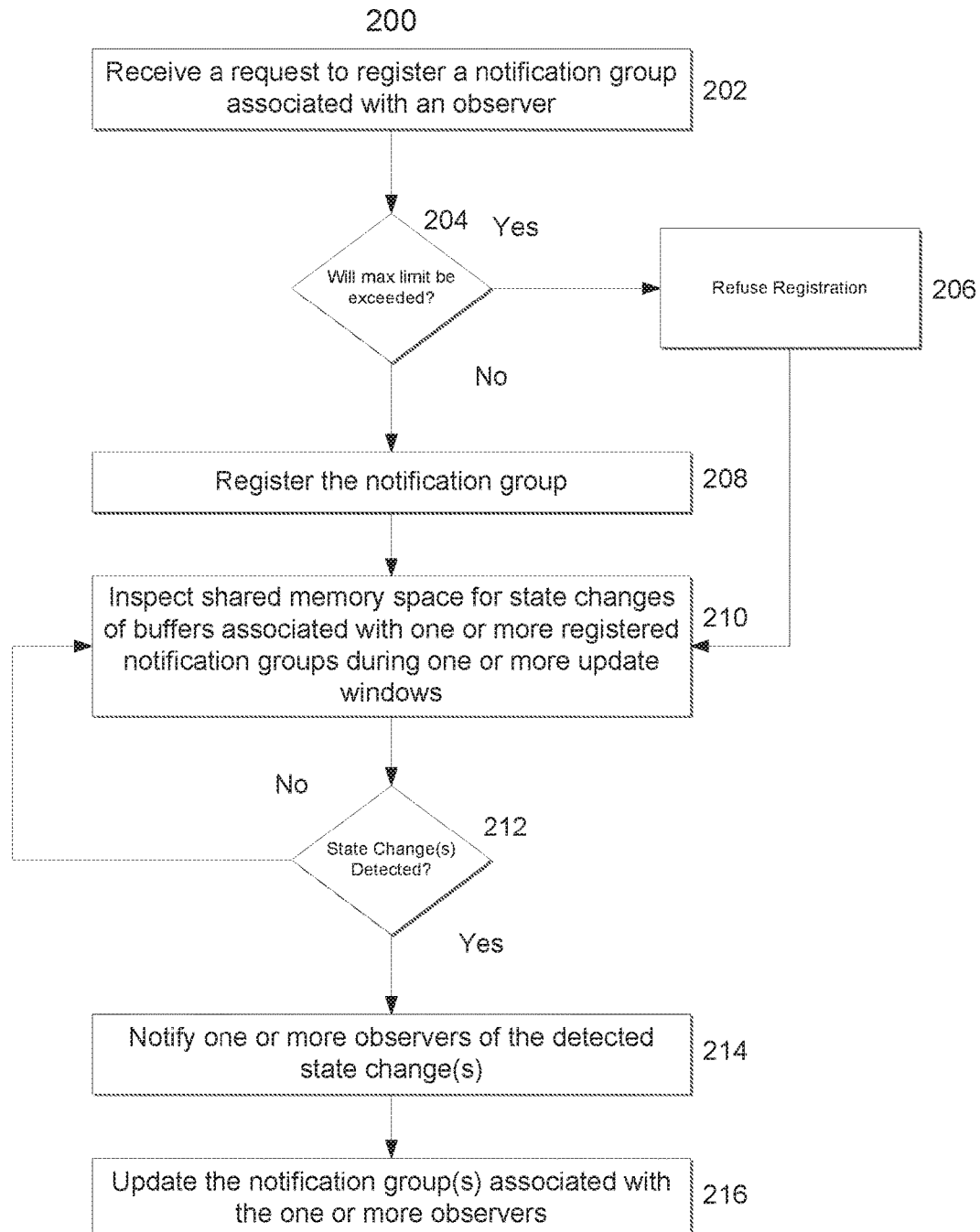
FIGS. 2-4 depict flow diagrams of example methods of notifying one or more observer objects according to example embodiments of the present disclosure.

FIG. 2 depicts a flow diagram of an example method (200) of notifying one or more observers of a state change according to example embodiments of the present disclosure. Method (200) can be implemented by one or more computing devices, such as one or more of the computing devices depicted in FIG. 5. In particular implementations, the method (200) can be implemented at least in part by scheduler 108 and/or scheduler 110 of FIG. 1. In addition, FIG. 2 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving a request to register a notification group associated with an observer object associated with a first process in a computing system. For instance, the request can be received by a scheduler associated with the process. The notification group can indicate one or more subject objects (e.g. or associated buffers to which the subject(s) write data) in one or more processes (e.g. the first process and/or one or more additional processes) that the observer wishes to observe (e.g. receive notifications associated with a state change of the subject). For instance, the notification group can include one or more buffer identifiers corresponding to the subject(s).

At (204), method (200) can include determining whether a maximum limit of buffer identifiers registered with the scheduler will be exceeded by registration of the notification group. If the maximum limit will not be exceeded, at (206), method (200) can include registering the notification group. If the maximum limit will be exceeded, at (208), method (200) can include refusing registration of the notification group.

At (210), method (200) can include inspecting a shared memory space accessible to the one or more processes for state changes. For instance, the state changes can be associated with one or more buffers in the shared memory space corresponding to a plurality of buffer identifiers included in one or more notification groups registered with the scheduler. As indicated, in some implementations, a state change associated with a buffer can be detected by comparing a current version of the buffer, as specified in the shared memory space, with a last known version of the buffer, as specified in a notification group. In some implementations, inspecting the shared memory space for state changes can include inspecting the shared memory space during one or more predetermined update windows. For instance, the update window(s) may be designated as available time intervals wherein the scheduler is permitted to inspect for state changes. In this manner, the scheduler may not be permitted to inspect for state changes outside of the update window(s).

In some implementations, inspecting the shared memory space can include iteratively cycling through each notification group with respect to the buffer identifiers included in the notification groups, and comparing the last known buffer version to the current buffer version. In this manner, the scheduler can locate a buffer in the shared memory space based at least in part on the corresponding buffer identifier. For instance, as indicated, the buffer identifier can be a buffer handle that points to the buffer in the shared memory space. In implementations wherein the shared memory space is accessible to multiple processes, subjects from multiple processes can be configured to write data to the shared memory space. In this manner, an observer in a first process can be configured to observe a subject in a second process that writes data to the shared memory space.

At (212), method (200) can include determining whether any state changes have been detected. If no state changes have been detected, method (200) can return to (210), and continue inspecting the shared memory space for state changes.

If one or more state changes have been detected, at (214), method (200) can include notifying one or more observers of the detected state change(s). As indicated, notifying one or more observers of the detected state change(s) can include notifying each observer of a state change responsive to detecting the state change. For instance, the scheduler can notify an observer of a state change during an update window in which the state change was detected. In alternative implementations, notifying the one or more observers of the detected state change(s) can include notifying the one or more observers subsequent to the update window in which state change was detected. In some implementations, notifying the one or more observers of the detected state change(s) can include notifying the one or more observers subsequent to a predetermined number of inspection cycles. For instance, notifying the one or more observers of the detected state change(s) can include respectively providing notifications indicative of the state change(s) to the appropriate observer(s).

At (216), method (200) can include updating the notification group(s) associated with the one or more observers notified of the state change(s). For instance, updating a notification group can include updating a last known version of the buffer to correspond to a current version of the buffer determined during the inspection of the shared memory space.

Figure 3:
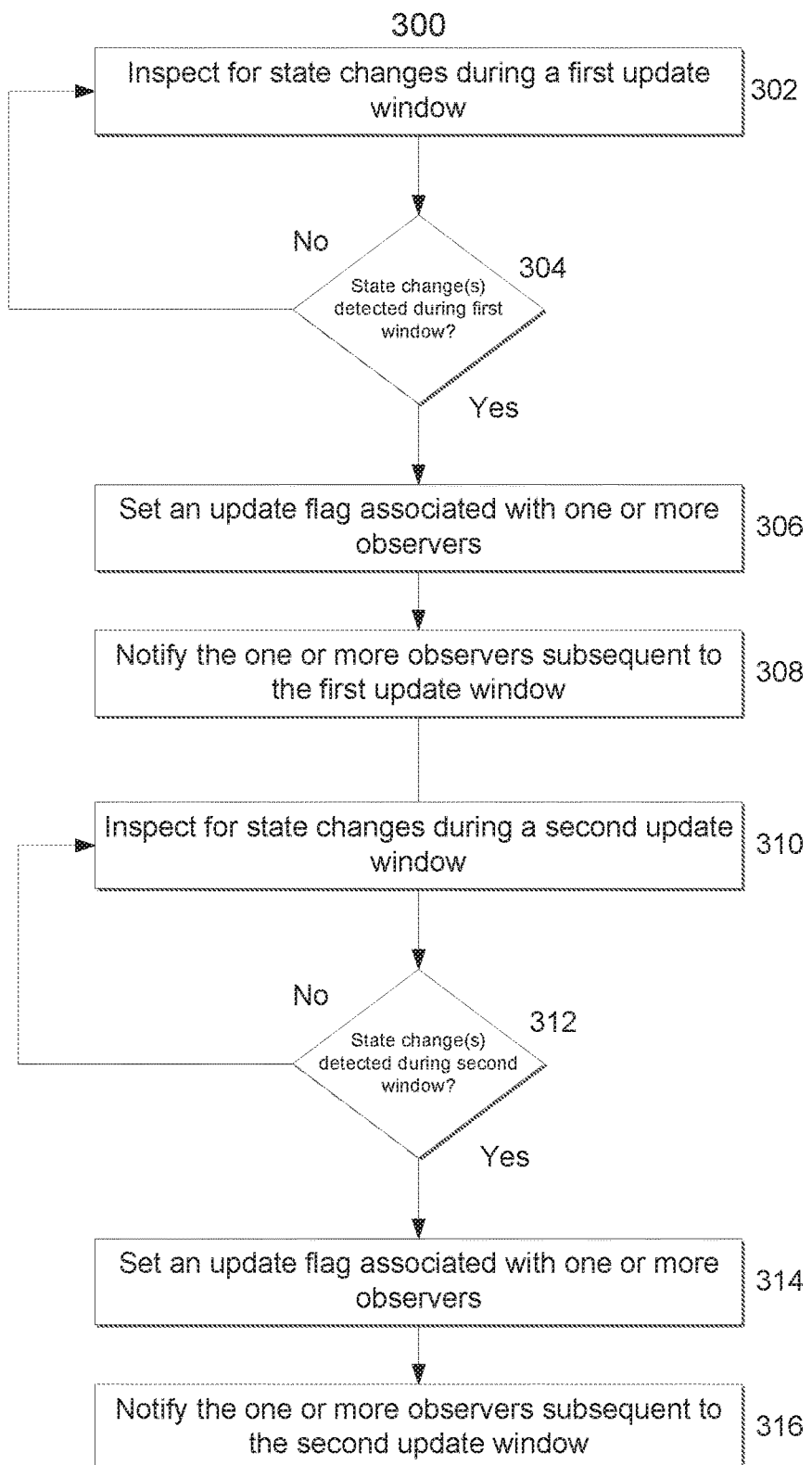

FIG. 3 depicts a flow diagram of an example method (300) of notifying one or more observers of one or more state changes. Method (300) can be implemented by one or more computing devices, such as one or more of the computing devices depicted in FIG. 5. In particular implementations, the method (300) can be implemented at least in part by scheduler 108 and/or scheduler 110 of FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include inspecting a shared memory space accessible to one or more processes for state changes during a first update window. The update window can be a time interval designated for state change inspection by a scheduler associated with one of the one or more processes.

At (304), method (300) can include determining whether one or more state changes have been detected in the first update window. If no state changes are detected, method (300) can include returning to (302). If one or more state changes are detected, at (306), method (300) can include setting an update flag of one or more observers to be notified about the state change(s). For instance, a set update flag can indicate one or more observers to be notified. In some implementations, a priority can be determined between observers having set update flags. For instance, the priority can correspond to the order of flag setting, or other suitable priority. The observers can then be notified in an order determined by the priority.

At (308), method (300) can include notifying the one or more observers of the detected state change(s) subsequent to the first update window. For instance, at the completion of the first update window, update notifications can be provided to the observer(s) having set update flags. In some implementations, notifying the one or more observers of the detected state change(s) subsequent to the first update window can include notifying the one or more observers subsequent to a completion of an inspection cycle that include each buffer identifier in each notification group registered with the scheduler. In some implementations, an update flag associated with an observer can be reset once the observer is notified.

At (310), method (300) can include inspecting the shared memory space for state changes during a second update window that is subsequent to the first update window. At (312), method (300) can include determining whether one or more state changes have been detected in the second update window. If no state changes are detected, method (300) can include returning to (310). If one or more state changes are detected, at (314), method (300) can include setting an update flag associated with one or more observers to be notified about the state change(s). At (316), method (300) can include notifying the one or more observers of the state change(s) subsequent to the second update window.

Figure 4:
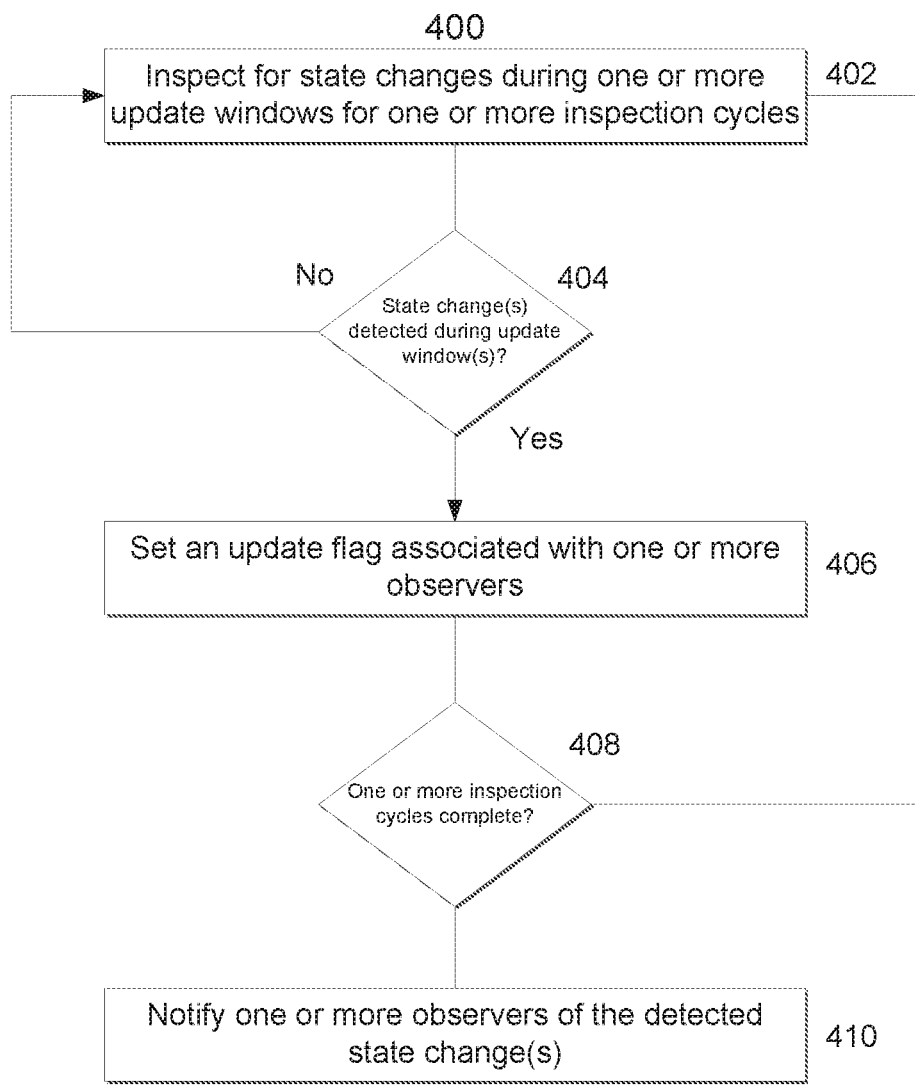

FIG. 4 depicts a flow diagram of an example method (400) of notifying one or more observers of one or more state changes according to example aspects of the present disclosure. Method (400) can be implemented by one or more computing devices, such as one or more of the computing devices depicted in FIG. 5. In particular implementations, the method (400) can be implemented at least in part by scheduler 108 and/or scheduler 110 of FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include inspecting a shared memory space for state changes during one or more update windows for one or more inspection cycles. As indicated, an inspection cycle can include inspecting the shared memory space for state changes associated with each buffer identifier in each notification group registered with a scheduler. For instance, the scheduler can iteratively cycle through each buffer identifier.

At (404), method (400) can include determining whether any state changes have been detected during the one or more update windows. If no state changes have been detected, method (400) can return to (402). If one or more state changes have been detected, at (406), method (400) can include setting an update flag associated with one or more observers to be notified.

At (408), method (400) can include determining whether the one or more inspection cycles have been completed. If the inspection cycle(s) have not been completed, method (400) can include returning to (402). If the inspection cycle(s) have been completed, at (410), method (400) can include notifying one or more observers of the detected state change(s).

As indicated above, in implementation wherein multiple inspection cycles are used, the scheduler can cycle through each buffer identifier multiple times. In such scenario, the scheduler may detect multiple state changes of a buffer (e.g. a first state change during a first cycle, and a second state change during a second cycle). By waiting to notify the observer(s) until after the multiple cycles are complete, the scheduler may only provide one notification to the observer corresponding to the most recent state change. In this manner, only one notification is provided to the observer even though two state changes were detected.

Figure 5:
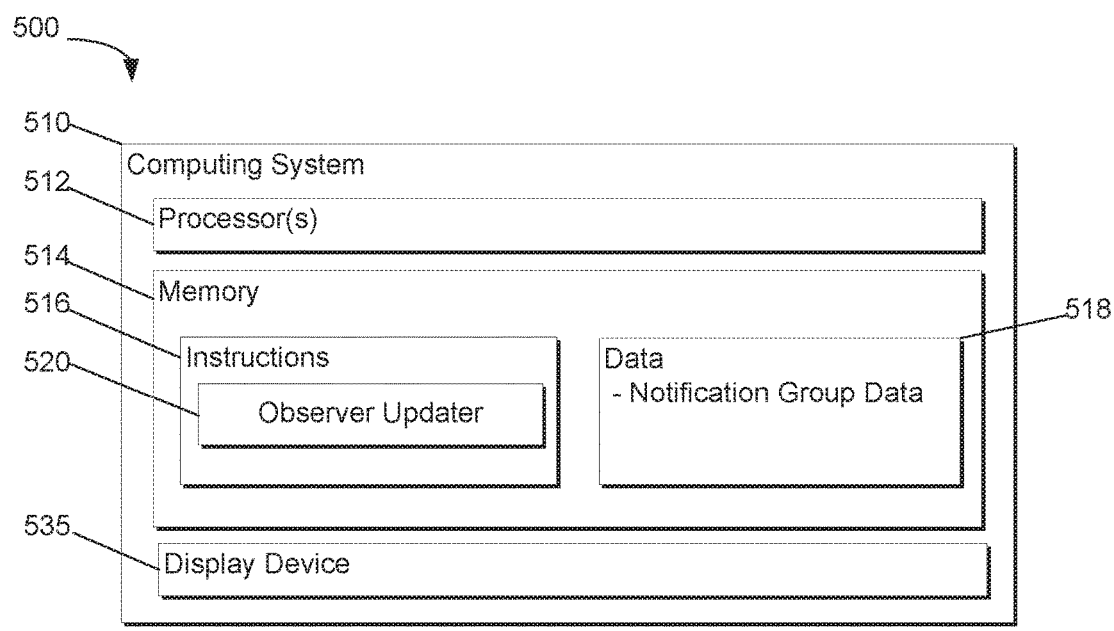
FIG. 5 depicts an example computing system according to example embodiments of the present disclosure.

FIG. 5 depicts computing system 500 that can be used to implement the methods and systems according to example aspects of the present disclosure. The system 500 can be implemented using a client-server architecture that includes a server that communicates with one or more client devices over a network. The system 500 can be implemented using other suitable architectures, such as a single computing device.

The system 500 includes a computing device 510. The computing device 510 can be implemented using one or more suitable computing devices. For instance, the computing device 510 can be a general purpose computer, special purpose computer, laptop, desktop, mobile device, navigation system, smartphone, tablet, wearable computing device, a display with one or more processors, or other suitable computing device. The computing device 510 can have one or more processors 512 configured to implement one or more processes and one or more memory devices 514. The computing device 510 can also include a network interface used to communicate with one or more remote computing devices over the network. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement an observer updater 520. Observer updater 520 can be configured to notify one or more observer objects of one or more state changes associated with one or more subject objects according to example embodiments of the present disclosure.

As shown in FIG. 5, the one or more memory devices 514 can also store data 518 that can be retrieved, manipulated, created, or stored by the one or more processors 512. The data 518 can include, for instance, notification group data generated according to example aspects of the present disclosure, and other data. The data 518 can be stored in one or more databases. In some implementations, the one or more databases can be connected to the computing device 510 by a high bandwidth LAN or WAN, or can also be connected to computing device 510 through network 540. The one or more databases can be split up so that they are located in multiple locales.

The computing device 510 of FIG. 5 can include various input/output devices for providing and receiving information from a user, such as a touch screen, touch pad, data entry keys, speakers, and/or a microphone suitable for voice recognition. For instance, the client device 530 can have a display device 535 for presenting a user interface displaying semantic place names according to example aspects of the present disclosure.

The network can be any type of communications network, such as a local area network (e.g. intranet), wide area network (e.g. Internet), cellular network, or some combination thereof. The network can also include a direct connection between the computing device 510 and a remote computing device. In general, communication between the computing device 510 and a remote computing device can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for notifying one or more observers of a state change, the system comprising:
   at least one subject configured to write data to a buffer in a shared memory space;
   one or more observers, each observer having an associated notification group comprising one or more buffer identifiers, each buffer identifier corresponding to a buffer in the shared memory space which is associated with the at least one subject; and
   a scheduler in communication with the associated notification group and configured (i) to monitor each buffer to determine one or more state changes associated with one or more buffers in the shared memory space, the monitoring including determining a state change relative to each observer including comparing a current version of each buffer as specified to a last known version of the respective buffer as specified in the notification group and determining whether a match exists indicative of no change or a discrepancy indicative of a state change, and (ii) to provide an update notification based at least in part on the one or more detected state changes to the associated notification group which is accessible by the one or more observers.

2. The system of claim 1, wherein each buffer identifier in the notification group points to the last known version of the buffer.

3. The system of claim 2, wherein each buffer in the shared memory space has an associated current version.

4. The system of claim 1, wherein the scheduler is configured to iteratively cycle through at least a subset of buffer identifiers during an update window.

5. The system of claim 4, wherein the scheduler is configured to iteratively cycle through each buffer identifier in each notification group one or more times during the update window.

6. The system of claim 1, wherein each of the one or more observers are registered with the scheduler.

7. The system of claim 6, wherein the scheduler imposes a preset limit of observers that are permitted to register with the scheduler.

8. The system of claim 1, wherein at least one observer is located in a different process than the at least one subject.

9. The system of claim 1, wherein each buffer identifier comprises a buffer handle pointing to a buffer in the shared memory space.

10. A computer-implemented method of notifying one or more observer objects of one or more state changes, the method comprising:

receiving, by a scheduler being a component associated with a computing process, a request to register a notification group associated with an observer object, the notification group comprising data indicative of one or more subject objects;

monitoring, by the scheduler, one or more buffers within a shared memory space to determine state changes associated with the one or more buffers in the shared memory space relative to each observer, wherein each buffer corresponds to at least one of the one or more subject objects by determining a state change relative to each observer including comparing a current version of each buffer as specified to a last known version of the respective buffer as specified in the notification group and determining whether a match exists indicative of no change or a discrepancy indicative of a state change;

and providing, by the scheduler, an update notification indicative of at least one detected state change associated with at least one buffer to the associated notification group to be assessible to the one or more observer objects.

11. The computer-implemented method of claim 10, further comprising registering, by the scheduler, the notification group.

12. The computer-implemented method of claim 10, further comprising: comparing, by the scheduler, a number of currently registered notification groups to a maximum preset limit; and determining, by the scheduler, whether to register the notification group based at least in part on the comparison.

13. The computer-implemented method of claim 10, wherein inspecting, by the scheduler, a shared memory space for state changes associated with one or more buffers in the shared memory space comprises inspecting the shared memory space during one or more update windows.

14. The computer-implemented method of claim 13, wherein determining, by the scheduler, at least one state change associated with at least one buffer comprises detecting a first state change during a first update window.

15. The computer-implemented method of claim 14, wherein providing, by the scheduler, a notification indicative of a state change associated with at least one buffer to one or more observer objects comprises providing a first notification indicative of the first state change subsequent to the first update window.

16. The computer-implemented method of claim 14, wherein determining, by the scheduler, at least one state change associated with at least one buffer comprises detecting a second state change during a second update window, the second update window being subsequent to the first update window.

17. The computer-implemented method of claim 16, wherein providing, by the scheduler, a notification indicative of a state change associated with at least one buffer to one or more observer objects comprises providing a second notification indicative of the second state change subsequent to the second update window.

18. The computer-implemented method of claim 10, wherein providing, by the scheduler, a notification indicative of at least one detected state change associated with at least one buffer to one or more observer objects comprises providing the notification subsequent to one or more inspection cycles.

19. The computer-implemented method of claim 10, further comprising updating, by the scheduler, at least one notification group based at least in part on the one or more detected state changes.

* * * * *